United States Patent [19]
Kanzaki

[11] Patent Number: 5,901,283
[45] Date of Patent: May 4, 1999

[54] MICROCOMPUTER

[75] Inventor: Teruaki Kanzaki, Hyogo, Japan

[73] Assignees: Mitsubishi Electric Semiconductor Software Co., Ltd, Hyogo; Mitsubishi Denki Kabushiki Kaisha, Tokyo, both of Japan

[21] Appl. No.: 08/790,264

[22] Filed: Jan. 28, 1997

[30] Foreign Application Priority Data

Sep. 4, 1996 [JP] Japan .................................. 8-234125

[51] Int. Cl.$^6$ .................................................. G06F 11/00
[52] U.S. Cl. .............................. 395/183.14; 395/183.11; 395/183.13; 395/568; 395/704
[58] Field of Search .................... 395/183.08, 183.11, 395/183.13, 183.14, 568, 704

[56] References Cited

U.S. PATENT DOCUMENTS

| | | | |
|---|---|---|---|
| 4,438,490 | 3/1984 | Wilder, Jr. | 395/184.01 |
| 4,462,077 | 7/1984 | York | 395/183.21 |
| 4,598,364 | 7/1986 | Gum et al. | 395/183.14 |
| 4,835,675 | 5/1989 | Kawai . | |
| 4,887,267 | 12/1989 | Kanuma | 371/22.31 |
| 5,265,254 | 11/1993 | Blasciak et al. | 395/183.11 |
| 5,345,580 | 9/1994 | Tamaru et al. | 395/500 |
| 5,386,565 | 1/1995 | Tanaka et al. | 395/704 |
| 5,560,036 | 9/1996 | Yoshida | 395/568 |
| 5,603,033 | 2/1997 | Joannin | 395/704 |
| 5,701,488 | 12/1997 | Mulchandani | 395/704 |

FOREIGN PATENT DOCUMENTS

| | | |
|---|---|---|
| 59-229655 | 12/1984 | Japan . |
| 62-8235 | 1/1987 | Japan . |
| 62-288946 | 12/1987 | Japan . |
| 63-129432 | 6/1988 | Japan . |
| 2250122 | 10/1990 | Japan . |
| 3105433 | 5/1991 | Japan . |
| 5100902 | 4/1993 | Japan . |
| 5143390 | 6/1993 | Japan . |
| 6282461 | 10/1994 | Japan . |

OTHER PUBLICATIONS

Doehle et al., "Comparator Logic To Assist Trace Facility For ROS Programs", IBM Technical Disclosure Bulletin, vol. 26, No. 3B, Aug. 1993, p. 1566.

"Tailorable Embedded Event Trace ", IBM Technical Disclosure Bulletin, vol. 34, No. 7B, Dec. 1991, pp. 259–261.

Primary Examiner—William M. Treat
Attorney, Agent, or Firm—Leydig, Voit & Mayer

[57] ABSTRACT

A microcomputer includes a central processing unit for sequentially executing instructions according to a software program. When the CPU decodes a marker, the CPU determines the location of the marker within the software program and produces a marker decoding signal showing that the CPU has decoded the marker. A monitor unit obtains CPU operation information about operation of the CPU in response to the marker decoding signal. The monitor unit provides to a storage unit the CPU operation information and a marker identifier showing that the marker has been decoded.

4 Claims, 6 Drawing Sheets

STA A, ADRS1
LDA A, ADRS2
JMP ADRS3
MRK
STA A, ADRS1

MICROCOMPUTER

BACKGROUND OF THE INVENTION

1. Field of the Invention

The present invention relates to a microcomputer provided with a monitor circuit for tracing, i.e., keeping track of operations of a central processing unit (CPU) disposed in the microcomputer.

2. Description of the Prior Art

In order to develop computer systems, it is necessary to implement development work accompanied by verification of whether or not software programs to control operations of the CPU are executed properly. Furthermore, a single chip microcomputer having a built-in monitor circuit for monitoring instructions or the like provided by the CPU has been used recently.

Referring now to FIG. 6, there is illustrated a block diagram showing the structure of such a prior art microcomputer. In the figure, reference numeral 100 denotes a single chip microcomputer, 110 denotes a CPU, 120 denotes a memory for storing a software program for controlling operations of the CPU 110, data and the like, 130 denotes a bus interface unit for linking buses of the CPU 110 to buses of the memory 120, and 140 denotes a monitor unit for keeping track of the execution of an instruction by the CPU 110. Furthermore, reference numeral 150 denotes a tristate buffer, 160 denotes a flag register for storing a flag determining whether or not the monitor unit keeps track of operations of the CPU, 170 denotes a storage unit for storing trace information obtained by the monitor unit 140, and 180 denotes an external terminal through which a signal for setting the flag in the flag register 160 is applied to the flag register 160 from outside the microcomputer. In addition, reference numeral 191 denotes a data bus, 192 denotes an address bus, 193 denotes a group of control signal lines, 194 denotes a CPU data bus, and 195 denotes a CPU address bus.

Next, a description will be made as to the operation of the prior art microcomputer. The monitor unit 140 can latch signals on the CPU address bus 195 and CPU data bus 194 connecting the CPU 110 to the bus interface unit 130 according to a signal on the group 193 of control signal lines and furnish a piece of trace information about the type of an instruction executed by the CPU 110, the address specifying a memory location in the memory in which the instruction is stored and data processed by the instruction. When the flag register 160 is set to "High" state by way of the external terminal 180, that is, when the monitor unit is allowed to store such a piece of trace information in the storage unit 170, the trace information furnished by the monitor unit 140 is written into the storage unit 170 by way of the tristate buffer 150. When the summation of all pieces of trace information sequentially stored in the storage unit exceeds the storage capacity of the storage unit 170, the oldest piece of trace information is erased so that a new piece of trace information can be stored in the storage unit. On the other hand, when the flag register 160 is set to "Low" state, a piece of trace information from the monitor unit 140 cannot be stored in the storage unit 170.

Therefore, a problem with such a prior art microcomputer having the structure mentioned above is that in order to check the main stream of an operation of a software program, that is, check the operation of the program from a broad perspective, the amount of information to be traced is increased and therefore a storage unit having a large amount of memory is needed.

SUMMARY OF THE INVENTION

The object of the present invention is to overcome the above problem. More precisely, it is an object of the present invention to provide a microcomputer capable of checking the main stream of the operation of a software program even though the storage capacity of a storage unit for storing trace information about an operation of a software program is not sufficient.

In accordance with the present invention, there is provided a microcomputer comprising a central processing unit (CPU) for sequentially executing instructions according to a software program and for, when the CPU decodes a marker indicating its location within the software program, furnishing a marker decoding signal showing that the CPU has decoded the marker, and a monitor unit, responsive to the marker decoding signal, for obtaining CPU operation information about operations of the CPU and furnishing the CPU operation information and a marker identifier showing that the marker has been decoded.

In accordance with a preferred embodiment of the present invention, the microcomputer further comprises a storage unit for storing the CPU operation information and the marker identifier furnished by the monitor unit.

Preferably, the CPU operation information can include at least addresses specifying memory locations in which instruction codes that respectively correspond to instructions executed and included in the software program are stored.

In accordance with another preferred embodiment of the present invention, when the CPU decodes the marker, the CPU also furnishes the value of an accumulator thereof via a data bus disposed within the microcomputer, and the monitor unit obtains and furnishes the value of the accumulator on the data bus as a piece of the CPU operation information in response to the marker decoding signal from the CPU.

In accordance with another preferred embodiment of the present invention, the microcomputer further comprises a user-programmable register for storing a specific address and an address comparator for comparing an address on an address bus of the CPU with the specific address stored in the user-programmable register and furnishing a control signal when the address on the address bus of the CPU is coincident with the specific address. Furthermore, when the monitor unit receives the control signal, from then on, it is enabled to obtain and furnish detailed trace information about operations of the CPU including at least addresses indicating memory locations in which instruction codes that respectively correspond to instructions executed and included in the software program are stored and the types of the instructions executed.

Further objects and advantages of the present invention will be apparent from the following description of the preferred embodiments of the invention as illustrated in the accompanying drawings.

BRIEF DESCRIPTION OF THE DRAWINGS

FIG. 2 is a view showing a part of a software program source file written in the assembler language;

DETAILED DESCRIPTION OF THE PREFERRED EMBODIMENTS

Figure 1:
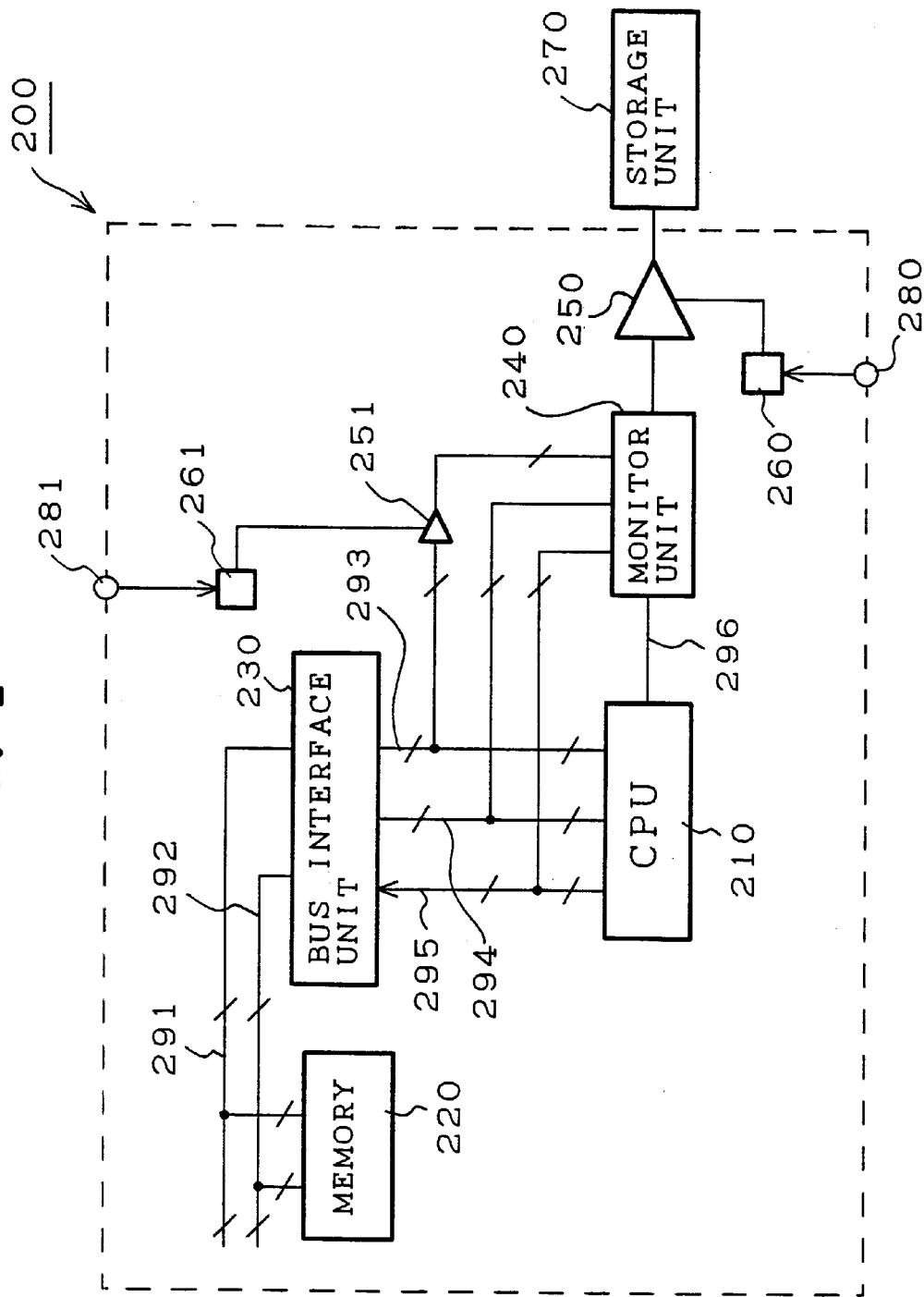
FIG. 1 is a block diagram showing the structure of a microcomputer according to a first embodiment of the present invention.

Referring next to FIG. 1, there is illustrated a block diagram showing the structure of a microcomputer according to a first embodiment of the present invention. In the figure, reference numeral 200 denotes a single chip microcomputer, 210 denotes a CPU, 220 denotes a memory for storing a software program for controlling operations of the CPU 210, data and the like, 230 denotes a bus interface unit for linking buses of the CPU 210 to buses of the memory 220, and 240 denotes a monitor unit for tracing or keeping track of the execution of an instruction by the CPU 110. Furthermore, each of reference numerals 250 and 251 denotes a tristate buffer, 260 denotes a trace flag register for storing a flag determining whether or not the monitor unit keeps track of operations of the CPU, 261 denotes a detailed trace flag register for storing a flag determining whether or not the monitor unit keeps detailed track of operations of the CPU, 270 denotes a storage unit for storing trace information about operations of the CPU (i.e. an operation of a software program executed by the CPU) obtained by the monitor unit 240, 280 denotes an external terminal through which a signal for setting the first flag in the trace flag register 260 is applied to the trace flag register 260 from outside the single chip microcomputer 200, and 281 denotes another external terminal through which a signal for setting the second flag in the detailed trace flag register 261 is applied to the detailed trace flag register 261 from outside the single chip microcomputer 200. In addition, reference numeral 291 denotes a data bus, 292 denotes an address bus, 293 denotes a group of control signal lines, 294 denotes a CPU data bus, 295 denotes a CPU address bus, and 296 denotes a control signal line through which when the CPU 210 decodes a marker which is a specific instruction, it furnishes a pulse signal for showing the decoding of the marker to the monitor unit 240.

Next, a description will be made as to the operation of the microcomputer of the first embodiment. Referring next to FIG. 2, there is illustrated a view showing a part of a software program source file written in the assembly language which is to be executed by the CPU 210. In the figure, (A) shows addresses, and (B) shows instructions. Actually, the CPU 210 executes a set of machine codes which correspond to such a source program written in the assembly language. For example, the instruction "STA A, ADRS1" specified by the address "4000H" states that the value of an accumulator A in the CPU 210 is written into a memory location specified by the address ADRS1. Furthermore, the instruction "MRK" specified by the address "400BH" is a marker showing its location within the software program. When the CPU 210 decodes the instruction code of the marker, it furnishes a pulse for showing the decoding of the instruction code that corresponds to the marker to the monitor unit 240 by way of the control signal line 296.

When the flag stored in the trace flag register 260 is set to "Low", the tristate buffer 250 switches to the OFF state. As a result, the monitor unit 240 is disabled to store trace information about an operation of the software program executed by the CPU 210 in the storage unit 270.

On the other hand, when the flag stored in the trace flag register 260 is set to "High" by way of the external terminal 280, and the flag stored in the detailed trace flag register 261 is set to "Low", the monitor unit 240 does not trace detailed data about an operation of the software program executed by the CPU, but stores only a marker and the address of the marker in the storage unit 270. That is, when the flag in the detailed trace flag register 261 is set to "Low", the tristate buffer 251 switches to the OFF state and hence a control signal from the CPU 210 cannot be delivered to the monitor unit. Accordingly, the monitor unit 240 is disabled to latch the detailed information on the address specifying a memory location in which an instruction code executed by the CPU 210 is stored, data output by the CPU, and the like, and therefore the information cannot be transferred to the storage unit 270. In this case, when the CPU decodes a marker and furnishes a pulse showing the decoding of the marker to the monitor unit 240 via the control signal line 296, the monitor unit 240 latches and delivers the address of the marker to the storage unit 270.

When the flag stored in the trace flag register 260 is set to "High" by way of the external terminal 280, and the flag stored in the detailed trace flag register 261 is set to "High" by way of the external terminal 281, the monitor unit 240 keeps track of detailed information about an operation of the software program executed by the CPU and stores a marker and the address of the marker as well as the detailed information in the storage unit 270. That is, when the flag in the detailed trace flag register 261 is set to "High", the tristate buffer 251 switches to the ON state and hence a control signal from the CPU 210 can be delivered to the monitor unit 240 by way of the group of control signal lines 293. Accordingly, in response to the control signal, the monitor unit 240 latches an address which appears on the CPU address bus 295 and data which appears on the CPU data bus 294, and transfers detailed information about the type of an instruction code executed by the CPU 210, the address specifying a memory location in which the instruction code is stored, the data that has been processed by the instruction, and the like to the storage unit 270. Furthermore, when the CPU 210 decodes the instruction code of a marker, it furnishes a pulse showing that the instruction code of the marker has been delivered thereto, by way of the control signal line 296. When the monitor unit 240 receives the pulse, it latches the address of the marker on the CPU address bus 295 and delivers data indicating the marker as well as the address of the marker to the storage unit 270. The storage unit 270 stores the information delivered thereto therein. Thus, the trace information stored in the storage unit can be used for checking the operation of the software program.

Figure 3:
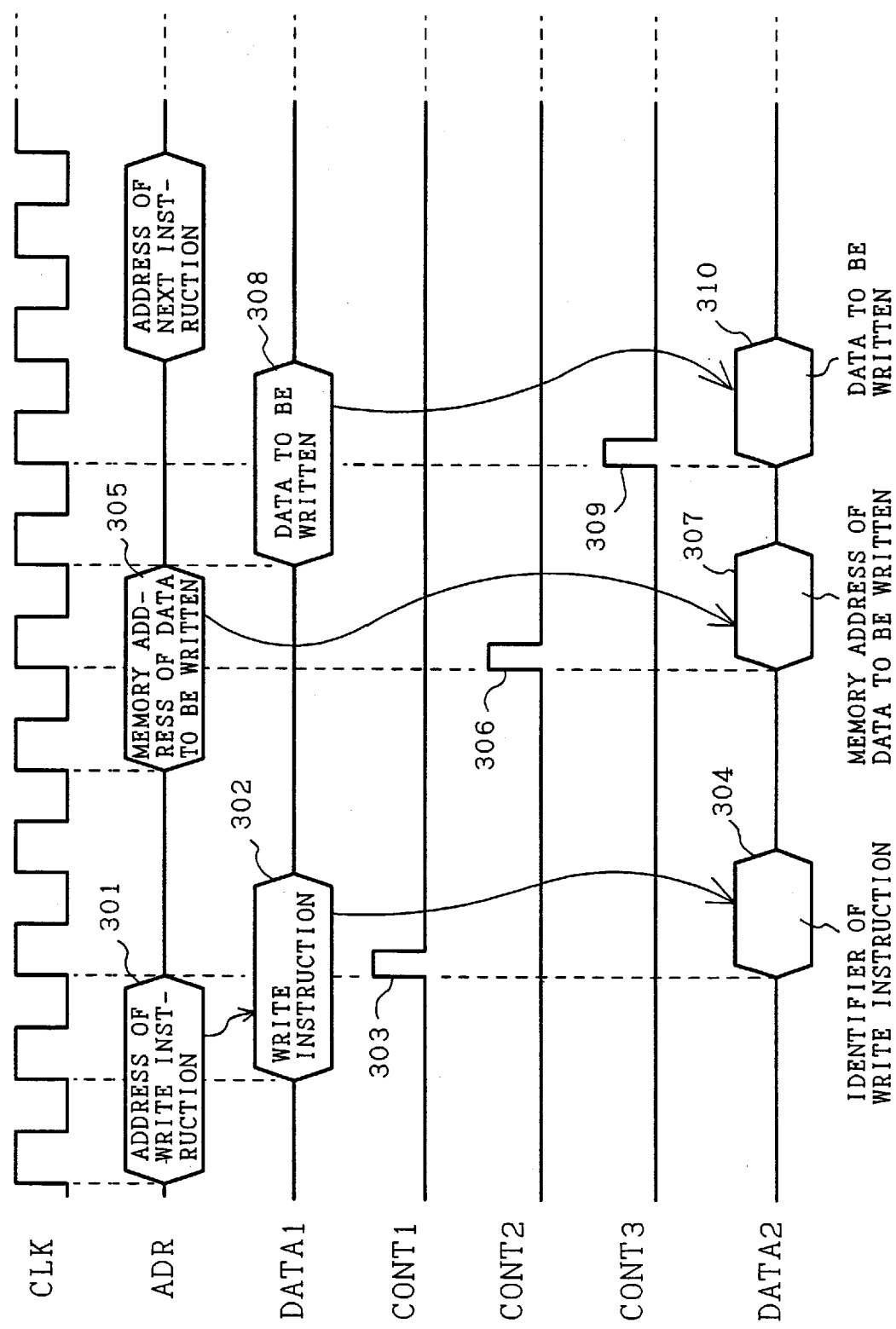
FIG. 3 is a timing diagram showing the timing of signals which appear within the microcomputer of the first embodiment shown in FIG. 1 when the CPU executes a write instruction.

Referring now to FIG. 3, there is illustrated a timing diagram showing the timing of signals which appear within the microcomputer when the CPU 210 executes a write instruction such as "STA A, ADRS1" in the case of where the flag in the detailed trace flag register 261 is set to "High". In the figure, the uppermost waveform CLK shows a reference clock signal, the next waveform ADR shows an address on the CPU address bus 295, the next waveform DATA1 shows data on the CPU data bus 294, the next waveform CONT1 shows a pulse signal which is delivered by the CPU 210 via one of the group of control signal lines 293 when a write instruction is executed by the CPU, the next waveform CONT2 shows a pulse signal which is delivered by the CPU 210 via one of the group of control signal lines 293 when the address of a memory location into which data is to be written is output by the CPU, the next waveform CONT3 shows a pulse signal which is delivered by the CPU 210 via one of the group of control signal lines 293 when the data to be written into the above memory location is output by the CPU, and the next waveform DATA2 shows trace information which is delivered to the storage unit 270 by the monitor unit 240.

When the CPU 210 delivers an address 301 specifying the memory location of a write instruction in the memory by way of the CPU address bus 295, the write instruction 302 stored in the memory location specified by the address 301 is furnished via the CPU data bus 294 by the bus interface unit 230 or the memory 220. Furthermore, the CPU 210 furnishes a pulse 303 showing that the write instruction has been delivered thereto. When the monitor unit 240 receives the pulse transferred thereto via the group 296 of control signal lines, it delivers a write instruction identifier such as "W" to the storage unit 304.

After that, the CPU 210 delivers a memory address 305 indicating the memory location into which data is to be written, by way of the CPU address bus 295. Then, the CPU 210 furnishes a pulse 306 showing that the CPU has delivered the memory address 305 indicating the memory location into which data is to be written. When the monitor unit 240 receives the pulse 306, it latches the memory address 305 delivered by way of the CPU address bus 295 and delivers it as a memory address 307 into which data is to be written to the storage unit 270. Then, the CPU 210 delivers data 308 which is to be written into the memory location via the CPU data bus 294 and furnishes a pulse 309 showing that the CPU has delivered the data to the monitor unit 240. When the monitor unit 240 receives the pulse 309, it latches the data 308 which is to be written into the memory and delivers it as data 310 which is to be written into the memory to the storage unit 270.

Thus, when a write instruction is executed by the CPU, the identifier showing the execution of the write instruction, the address specifying the memory location into which data is written, and the data to be written into the memory location from the monitor unit 240 are transferred to and are stored as trace data in the storage unit 270. Similarly, when a read instruction to read data from the memory 220 or a jump instruction to cause a jump to another address is executed, the trace data about the instruction from the monitor unit 240 are delivered to and are stored in the storage unit 270.

Figure 4:
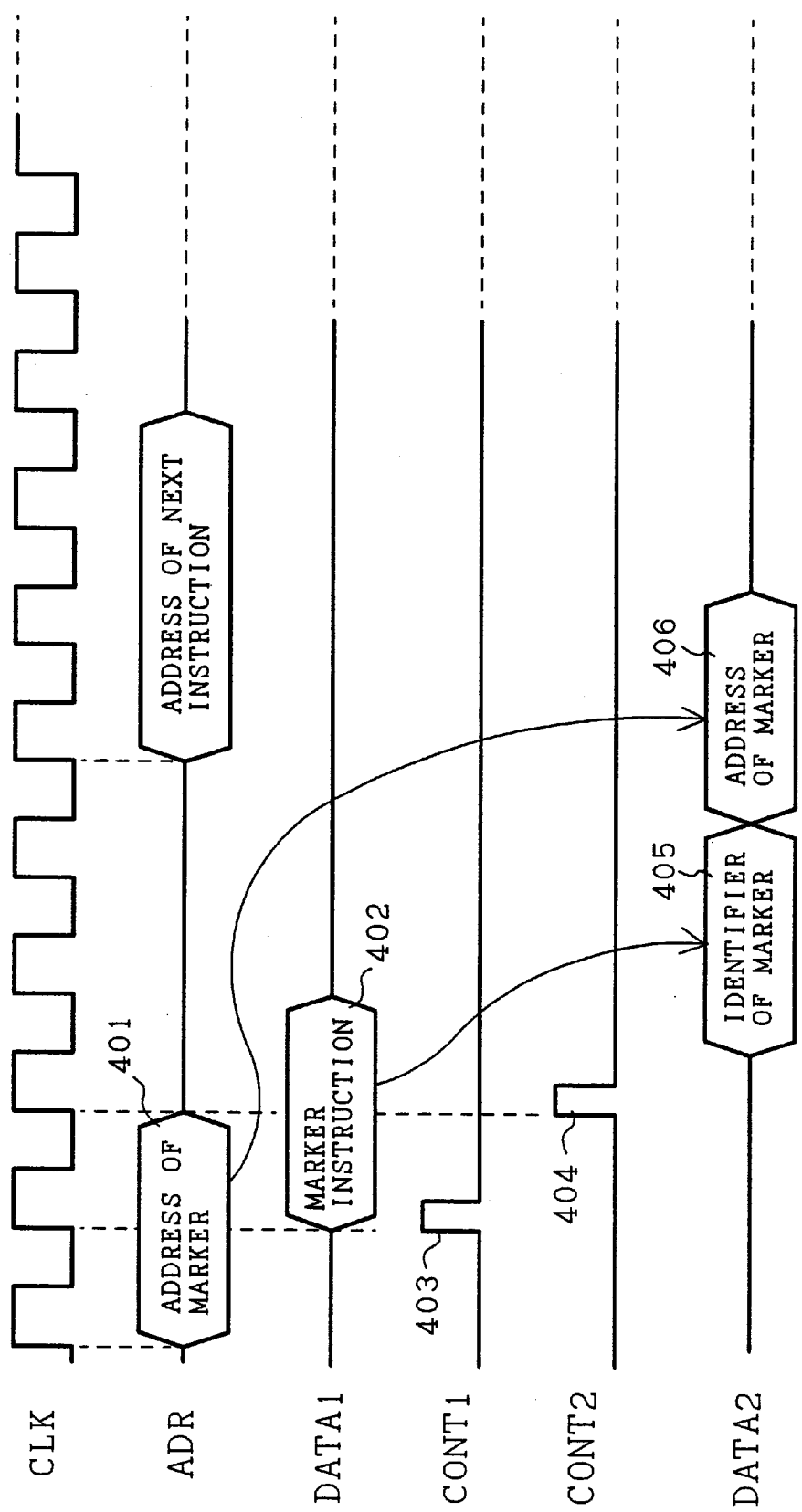
FIG. 4 is a timing diagram showing the timing of signals which appear within the microcomputer of the first embodiment shown in FIG. 1 when the CPU decodes the instruction code of a marker in the case of where a monitor unit is allowed to keep track of an operation of a software program.

Referring next to FIG. 4, there is illustrated a timing diagram showing the timing of signals which appear within the microcomputer when the CPU 210 decodes the instruction code of a marker in the case of where the flag in the trace flag register 260 is set to "High", that is, the monitor unit keeps track of an operation of the software program. In the figure, the uppermost waveform CLK shows a reference clock signal, the next waveform ADR shows an address on the CPU address bus 295, the next waveform DATA1 shows data on the CPU data bus 294, the next waveform CONT1 shows a pulse signal showing that the CPU 210 has delivered the address specifying a memory location in which the instruction code of a marker is stored via one of the group of control signal lines 293, the next waveform CONT2 shows a pulse signal which is delivered by the CPU 210 via the control signal line 296 when the CPU identifies the instruction code of a marker, and the next waveform DATA2 shows a marker identifier showing that the CPU has identified a marker and the address of the marker which are sequentially delivered by the monitor unit 240 when the CPU identifies the command of a marker.

When the CPU 210 identifies a marker, it delivers a marker address 401 specifying a memory location in which the instruction code of the marker is stored, by way of the CPU address bus 295 and a pulse 403 showing that the CPU 210 has delivered the marker address 401 by way of the group 293 of control signal lines. When the monitor unit 240 receives the pulse 403, it latches the marker address 401 on the CPU address bus 295. Then, when the marker instruction 402 from the bus interface unit 230 or memory 220 is transferred to the CPU 210 by way of the CPU data bus 294, the CPU 210 decodes the instruction code of the marker and furnishes a pulse 404 showing the decoding of the marker to the monitor unit 240 via the control signal line 296. When the monitor unit 240 receives the pulse 404, it furnishes an identifier showing that the marker instruction has been executed, such as "M", and the marker address 406 that the monitor unit has latched to the storage unit 270.

Thus, the microcomputer according to the first embodiment of the present invention is adapted to execute a software program including markers and store only the identifier and addresses of the markers in the storage unit. Accordingly, the microcomputer can keep track of the main stream of an operation of software programs without having to use a storage unit having a large amount of memory.

As previously explained, when the CPU 210 decodes the instruction code of a marker, the monitor unit is adapted to store the marker identifier and the address specifying a memory location in which the instruction code is stored in the storage unit 270. Alternatively, the CPU 210 is adapted to deliver the value of the accumulator thereof by way of the CPU data bus 294 when it decodes the instruction code of a marker, and the monitor unit 240 is adapted to latch the value of the accumulator on the CPU data bus 294 and furnish it as well as the identifier and address of the marker. In this variant, since the content of the accumulator, which is of importance to the operation of the software program, can be verified, the efficiency of developments of software programs can be improved.

Figure 5:
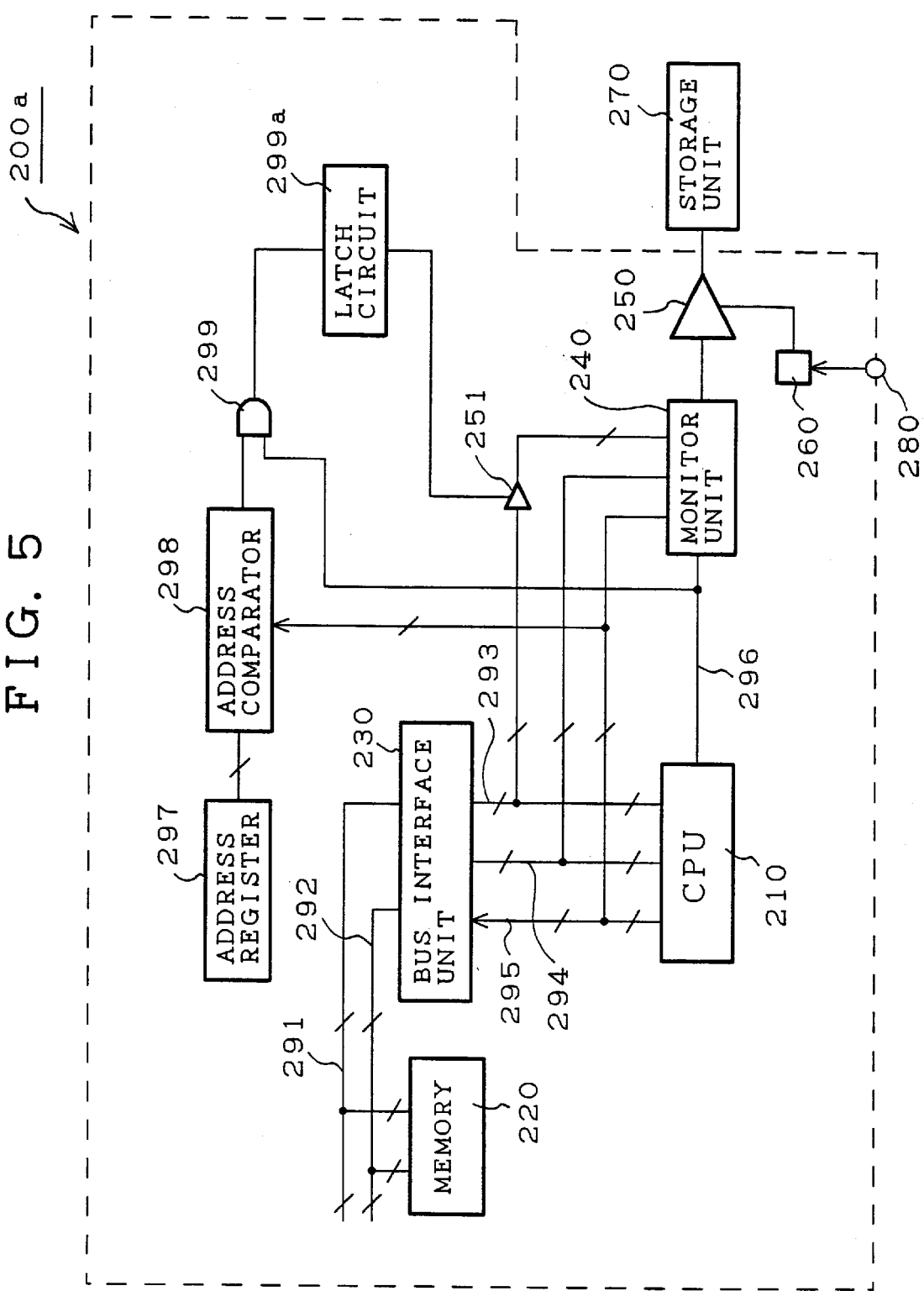
FIG. 5 is a block diagram showing the structure of a microcomputer according to a second embodiment of the present invention.
Figure 6:
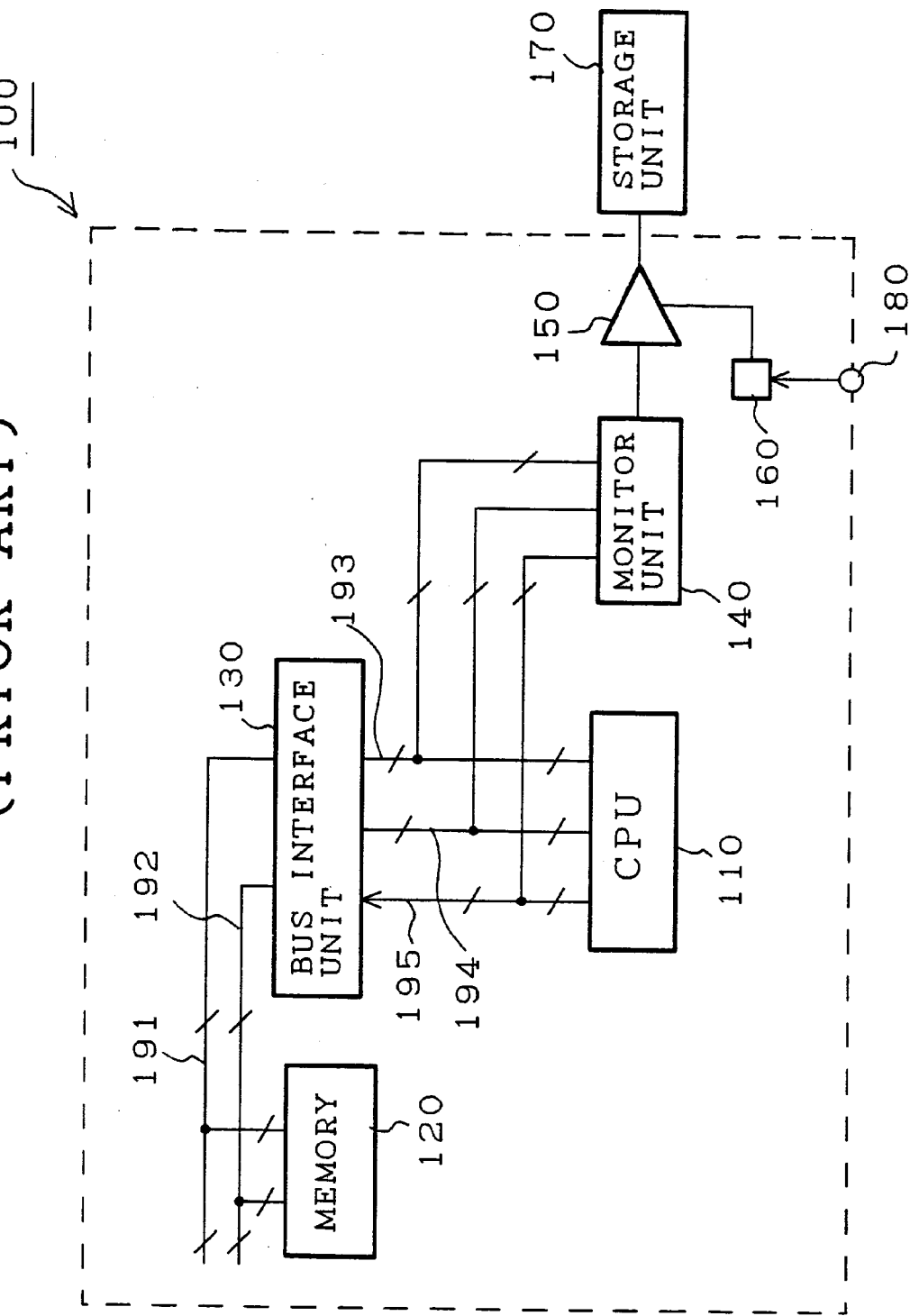
FIG. 6 is a block diagram showing the structure of a prior art microcomputer provided with a monitor unit.

Referring next to FIG. 5, there is illustrated a block diagram showing the structure of a microcomputer according to a second embodiment of the present invention. The same components as those shown in FIG. 1 are designated by the same reference numerals, and the duplicated description about the components will be omitted hereinafter. In the figure, reference numeral 200a denotes a single chip microcomputer, 297 denotes a use-programmable address register for storing a specific (or predetermined) address which is to be compared with an address delivered via the CPU address bus 295, 298 denotes an address comparator which compares the address in the address register 297 with an address on the CPU address bus 295, 299 denotes an AND gate, and 299a denotes a latch circuit. The address register 297 can be set by a signal delivered from outside the microcomputer applied to a terminal not shown in the figure. Alternatively, the value of the address register 297 can be defined by a software program executed by the CPU 210.

Next, a description will be made as to the operation of the microcomputer of this embodiment. In the first embodiment, only when the flag in the detailed trace flag register 261 is set to "High", the tristate buffer 251 allows the monitor unit 240 to furnish detailed trace information. On the contrary, in accordance with the second embodiment, when the value of an address on the CPU address bus 295 exceeds a predetermined value and the CPU 210 identifies a marker, the monitor unit 240 is enabled to obtain and furnish detailed trace information to the storage unit 270.

To this end, a marker is inserted into the top of a part of a software program the operation of which is to be traced and the address of the marker is written into the address register 297 first. Then, when the CPU 210 starts to execute the software program, the address comparator 298 starts to compare an address on the CPU address bus 295 with the address of the marker stored in the address register 297.

When the value of the address on the CPU address bus 295 is smaller than the value stored in the address register 297, the address comparator 298 furnishes a signal at "Low" level. Therefore, the output of the AND gate 299 becomes "Low" state regardless of the state of a control signal on the control signal line 296. As a result, the tristate buffer 251 switches to the OFF state and the monitor unit 240 furnishes only information about the marker to the storage unit 270.

On the other hand, when the value of the address on the CPU address bus 295 reaches the value stored in the address register 297, the address comparator 298 furnishes a signal at "High" level. Then, when the CPU decodes the marker, it furnishes a control signal at "High" level via the control signal line 296, so that the output of the AND gate 299 changes to "High" state. When the output of the AND gate 299 changes from "Low" state to "High" state, the latch circuit 299a keeps a signal delivered to the tristate buffer 251 in "High" state. After that, a control signal from the CPU 210 can be furnished to the monitor unit 240, and the monitor unit 240 operates so as to deliver detailed trace information to the storage unit 270.

Thus, the microcomputer according to the second embodiment of the present invention is adapted to store only the identifier and addresses of markers in the storage unit 270 during the execution of a part of a software program which is not of importance, and store detailed trace information in the storage unit 270 during the execution of the part of the software program which is of importance. Accordingly, the microcomputer can keep track of the main stream of an operation of a software program and check the trace information about a important part of the software program. Thereby, software programs can be developed with efficiency.

As previously explained, the present invention offers the following advantages.

In accordance with a preferred embodiment of the present invention, there is provided a microcomputer comprising a monitor unit, when the CPU executes a software program including a marker, for obtaining CPU operation information or trace information about operations of the CPU upon decoding the marker and furnishing a marker identifier showing that the marker has been decoded as well as the information. Therefore, the embodiment offers the advantage of being able to easily check the main stream of an operation of a software program.

In accordance with another preferred embodiment of the present invention, the microcomputer further comprises a storage unit for storing the CPU operation information and the marker identifier furnished by the monitor unit. Therefore, the embodiment offers the advantage of being able to easily check the main stream of an operation of a software program without having to use a storage unit having a large amount of memory.

In accordance with a preferred embodiment of the present invention, the CPU operation information can include addresses indicating memory locations in the memory in which instruction codes of instructions included in the software program are stored. Therefore, the embodiment offers the advantage of being able to easily check the main stream of an operation of a software program.

In accordance with another preferred embodiment of the present invention, when the CPU decodes the marker, the CPU also furnishes the value of an accumulator thereof via a data bus disposed within the microcomputer, and the monitor unit obtains and furnishes the value of the accumulator on the data bus as a piece of the information about operations of the CPU in response to the marker decoding signal showing that the CPU has decoded a marker from the CPU. Therefore, the embodiment offers the advantage of being able to easily check the operational condition of software programs.

In accordance with another preferred embodiment of the present invention, when an address furnished via the address bus of the CPU is coincident with a specific address stored in a user-programmable address register, the monitor unit obtains and furnishes detailed trace information about operations of the CPU including at least addresses specifying memory locations in the memory in which instruction codes which respectively correspond to instructions in the software program are stored and the types of the instructions. Therefore, the embodiment offers the advantage of being able to provide the user with detailed information about an operation of a part of a software program which is of importance to the user, and hence develop software programs with efficiency.

Many widely different embodiments of the present invention may be constructed without departing from the spirit and scope of the present invention. It should be understood that the present invention is not limited to the specific embodiments described in the specification, except as defined in the appended claims.

What is claimed is:

1. A microcomputer comprising:

a central processing unit (CPU) for sequentially executing instructions in a software program;

a monitor unit coupled to said CPU for tracing instructions executed by said CPU and outputting instruction information to a storage unit;

a trace flag register coupled to said monitor unit including a trace flag having a first state for enabling said monitor unit to output the instruction information to the storage unit and a second state for preventing said monitor unit from outputting the instruction information to the storage unit; and a detailed trace flag register coupled to said monitor unit including a detailed trace flag having a first state for enabling said monitor unit to output detailed trace information to the storage unit, the detailed trace information including instruction information, address information, and data information of the instructions executed by said CPU and a second state for enabling said monitor unit to output marker information to the storage unit and for preventing said monitor unit from outputting the detailed trace information to the storage unit.

2. The microcomputer according to claim 1 wherein said monitor unit outputs the detailed trace information to the storage unit in response to the first state of the trace flag and the first state of the detailed trace flag and said monitor unit outputs marker information to the storage unit and is prevented from outputting the detailed trace information to the storage unit in response to the first state of the trace flag and the second state of the detailed trace flag.

3. The microcomputer according to claim 1 wherein the marker information includes an address of a marker instruction and an identifier for identifying the marker instruction.

4. The microcomputer according to claim 2 wherein the marker information includes an address of a marker instruction and an identifier for identifying the marker instruction.

* * * * *